April 26, 1960
S. J. JENNINGS
2,933,770
ROTARY KNIFE COTTON GIN
Filed April 20, 1959
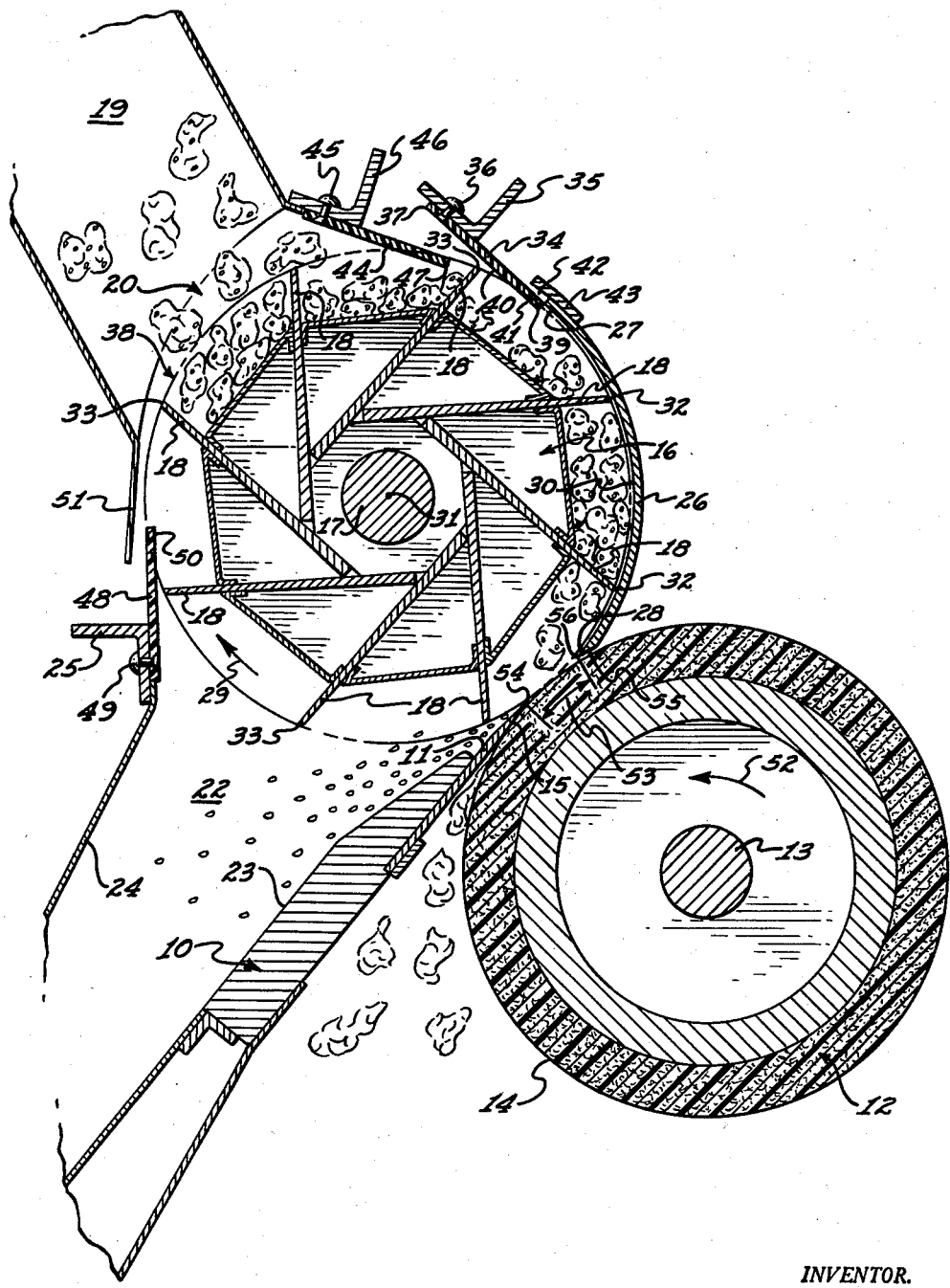
INVENTOR.
SAMUEL J. JENNINGS.
BY
William S. Grove
ATTORNEY.

United States Patent Office 2,933,770
Patented Apr. 26, 1960

2,933,770

ROTARY KNIFE COTTON GIN

Samuel J. Jennings, Phoenix, Ariz., assignor to Community Gin Company, Phoenix, Ariz., a partnership Application April 20, 1959, Serial No. 807,405

2 Claims. (Cl. 19—50)

This invention pertains to improvements in rotary knife cotton gins and is particularly directed to an improved method and apparatus for introducing cotton into a rotary knife gin.

This invention is a continuation-in-part application of my application Serial No. 638,110, filed February 4, 1957, now abandoned.

One of the objects of this invention is to induce the raw cotton to be processed into the spaces between the rotary knife blades rather than introducing the cotton directly on the gin roll of such machines so as to avoid cracked seed when the rotary knife approaches the roll.

Another object of this invention is to provide in a rotary knife blade gin having means to induce the raw cotton into the spaces between the rotary knife blades, a stationary guide plate about the periphery of the rotary knife blade edges immediately following the point of introduction of the raw cotton so that any cotton dropping on the rotary blade edges from the feed chute will be brushed into the pockets between the blades and held therein during the rotation of the knife blade reel.

Still another object of this invention is to provide a wiping device at the leading edge of the aforementioned guide plate yieldingly engaging the blade edges as the blades approach the leading edge of said guide so as to prevent the lodgement of any seeds on the blade edges which might otherwise be crushed against the guide plate as the blade edges rotate thereagainst.

And a still further object is to induce the raw cotton to be processed into the spaces between the rotary knife blades and then as the rotating stripper knife pockets approach the roll in a pouring or discharge position at the trailing edge of the guide plate, the cotton will fall on and be attached to the gin roll at the point of the roll exposure gap so that the cotton avoids the closure point of the rotary knife to the gin roll to thereby eliminate seed cracking at this point.

Further features and advantages of this invention will appear from a detailed description of the drawings in which:

The figure is a diagrammatic cross-section through a rotary knife cotton gin stand incorporating the features of this invention.

As an example of one embodiment of this invention there is shown a gin stand having a breastplate 10 with the stationary knife 11 appropriately fixed to the breastplate 10. The gin roll 12 is mounted on the roll shaft 13 in the frame (not shown) of the gin stand in the usual manner such as shown in application Serial Number 665,765, filed June 14, 1957, of Andrew O'Neal, now Patent No. 2,903,750, and in application Serial Number 638,110, filed February 4, 1957, mentioned above. The peripheral surface 14 of the gin roll 12 rotates against the surface 15 of the stationary knife 11 during the operation of the gin.

The rotary knife reel 16 is suitably mounted on the rotary knife shaft 17 suitably journaled on the frame (not shown) of the gin stand and has a series of circumferentially spaced rotary knife blades 18 suitably fixed to the reel 16. Preferably the blades 18 should be attached in a gradual spiral position for smooth and efficient operation of the device. A raw cotton feed chute 19 has a discharge opening at 20 directly adjacent the rotary knife reel for directly depositing the raw cotton thereagainst to be received in the pockets 21 between the blades 18. A seed chute 22 formed between the face 23 of the breastplate 10 and the baffle 24 is fixed to the angle iron support 25 fixed to the gin stand frame.

An arcuate guide plate 26 is suitably fixed relative to the rotary knife reel on the gin stand frame and has a leading edge 27 and a trailing edge 28 relative to blade rotation as indicated by the arrow 29, the radius of curvature of the concave surface 30 coinciding with the axis of rotation 31 of the rotary knife reel 16, with the clearance 32 between the outer peripheral edges 33 of the blades and the arcuate surface 30 of the guide plate 26 being preferably .010".

A wiper flap 34 of flexible plastic material is fixed to the rigid angle iron support 35 of the gin stand by suitable rivets 36 and has a leading edge 37 lying outside the cylindrical path of peripheral travel 38 of the blade edges 33 and a trailing edge 39 lying inside of said path of peripheral travel 38. As the reel 16 rotates the blade edges 33 up against the wiping face 40 the trailing end 41 folds into the space 42 up against the offset piece 43 fixed to the guide plate 26 so as to form a smooth aligned surface 40—30 as the blade edges 33 enter the guide plate 26 the flap 34 wiping all seed from the blade edges 33 before they enter the arcuate surface 30. Thus no seed can get wedged and crushed between the blade edges and the arcuate surface 30, the seed being confined in the pockets 21 of the reel 16.

A further wiper flap 44, similar to flap 34, is mounted by suitable rivets 45 on the angle iron support 46 having a trailing edge 47 lying within the path of travel 38 of the blade edges 33, this further wiper initially wiping the seeds of the raw cotton into the pockets 21 of the reel 16.

And still a third flap 48 may be provided on the angle iron support 25 and held thereon by the rivets 49 having a trailing edge 50 lying within the path of travel 38 of the blade edges 33 which also functions to wipe the seeds of the raw cotton into the reel pockets 21 while at the same time providing a seal between the reel 16 and the plate 51 of the feed chute 19 to keep the raw cotton from entering the seed chute 22.

In operation the gin roll is revolved in a counter-clockwise direction as indicated by the arrow 52 while the reel 16 revolves in a clockwise direction indicated by the arrow 29. The peripheral speed of the knife edges 33 of the reel 16 is slightly greater than the peripheral speed of the surface 14 of the gin roll so that the blade edges 33 relatively travel across the surface 14 of the gin roll across the exposure gap 53 from the guide plate trailing edge 28 to the edge 54 of the stationary knife 11 spreading the raw cotton over the gin roll surface 14 for ginning. It will be noted that a close clearance of .010" or less is maintained at 55 between the gin roll surface 14 and the end 56 of the trailing edge 28 of the guide plate 26 so that a substantially smooth blended surface is obtained between the surface 30 of the guide plate and the gin roll surface 14 so as to avoid any possibility of a seed in the raw cotton becoming wedged between the blade edge 33 and the gin roll surface 14 as the blade edge leaves the guide plate surface 30 and sweeps across the exposure gap 53.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a rotary knife cotton gin, a stationary knife, a rotatable gin roll engaging said knife, a rotary knife reel having a series of circumferentially spaced axially extending blades having raw cotton receiving pockets therebetween, a raw cotton feed chute having a discharge opening exposure gap adjacent the periphery of said rotary knife reel, a seed chute adjacent said stationary knife having an inlet opening to receive the ginned seed from the pockets of said rotary knife reel, and a curved guide plate extending axially of said knife reel having an arcuate surface coinciding with the path of peripheral travel of the edges of the blades of said knife reel and extending from a leading edge of said guide plate adjacent said feed chute discharge opening and a trailing edge thereof adjacent the exposure gap of said gin, and a wiper flap fixed relative to said rotary knife reel in a position between the discharge opening of said feed chute and the leading edge of said guide plate adapted to yieldingly engage the blade edges of said knife reel to wipe the raw cotton and its seeds into the pockets between said blades.

2. In a rotary knife cotton gin, a stationary knife, a rotatable gin roll engaging said knife, a rotary knife reel having a series of circumferentially spaced axially extending blades having raw cotton receiving pockets therebetween, a raw cotton feed chute having a discharge opening exposure gap adjacent the periphery of said rotary knife reel, a seed chute adjacent said stationary knife having an inlet opening to receive the ginned seed from the pockets of said rotary knife reel, and a curved guide plate extending axially of said knife reel having an arcuate surface coinciding with the path of peripheral travel of the edges of the blades of said knife reel and extending from a leading edge of said guide plate adjacent said feed chute discharge opening and a trailing edge thereof adjacent the exposure gap of said gin, and a wiper flap fixed relative to said rotary knife reel in a position between the discharge opening of said feed chute and the leading edge of said guide plate adapted to yieldingly engage the blade edges of said knife reel to wipe the raw cotton and its seeds into the pockets between said blades wherein said trailing edge of said wiper flap swings into alignment with the arcuate surface of said guide plate as said blade edges of the knives of said knife reel glide over said flap on said arcuate surface of said guide plate so as to prevent seed being wedged and crushed between said blade edges and said guide plate.

References Cited in the file of this patent

UNITED STATES PATENTS 1,717,569    Libert                 June 18, 1929

FOREIGN PATENTS

587      Great Britain                 of 1864